US012800926B2

(12) United States Patent
Song et al.

(10) Patent No.: US 12,800,926 B2
(45) Date of Patent: Nov. 17, 2026

(54) OPTICAL SYSTEM AND METHOD OF FORMING THE SAME

(71) Applicants: Agency for Science, Technology and Research, Singapore (SG); Nanyang Technological University, Singapore (SG)

(72) Inventors: Weitao Song, Singapore (SG); Xinan Liang, Singapore (SG); Yuanjin Zheng, Singapore (SG); Arseniy Kuznetsov, Singapore (SG)

(73) Assignees: Agency for Science, Technology and Research, Singapore (SG); Nanyang Technological University, Singapore (SG)

( * ) Notice: Subject to any disclaimer, the term of this patent is extended or adjusted under 35 U.S.C. 154(b) by 306 days.

(21) Appl. No.: 18/278,974

(22) PCT Filed: Feb. 25, 2022

(86) PCT No.: PCT/SG2022/050091

§ 371 (c)(1),
(2) Date: Aug. 25, 2023

(87) PCT Pub. No.: WO2022/197242

PCT Pub. Date: Sep. 22, 2022

(65) Prior Publication Data

US 2024/0134197 A1 Apr. 25, 2024
US 2024/0231098 A9 Jul. 11, 2024

(30) Foreign Application Priority Data

Mar. 16, 2021 (SG) ............................ 10202102665S

(51) Int. Cl.
*G02B 27/01* (2006.01)

(52) U.S. Cl.
CPC ..... *G02B 27/0172* (2013.01); *G02B 27/0179* (2013.01); *G02B 2027/0127* (2013.01);
(Continued)

(58) Field of Classification Search
CPC ............ G02B 27/0172; G02B 27/0179; G02B 2027/0127; G02B 2027/0174;
(Continued)

(56) References Cited

U.S. PATENT DOCUMENTS 9,851,568 B2 12/2017 Theytaz
10,514,573 B2 12/2019 Kuznetsov et al.
(Continued)

FOREIGN PATENT DOCUMENTS

CN 108319015 A 7/2018
CN 110596949 A * 12/2019 ........... G03H 1/2294
(Continued)

OTHER PUBLICATIONS

International Search Report for International Application No. PCT/SG2022/050091 dated May 11, 2022, pp. 1-3.
(Continued)

*Primary Examiner* — Sharrief I Broome
*Assistant Examiner* — K Muhammad
(74) *Attorney, Agent, or Firm* — Shackelford, McKinley & Norton, LLP

(57) ABSTRACT

An optical system and a method of forming the same. The optical system may include a light source configured to generate a light beam, the light beam being coherent or partially coherent. The optical system may also include a spatial light modulator configured to modulate a phase of the light beam. The optical system may further include an eyepiece for directing the modulated light beam to an eye of a viewer, the eyepiece arranged such that an optical distance between the spatial light modulator and a main plane of the
(Continued)

eyepiece is greater than a focal length of the eyepiece. The spatial light modulator may include an active display area having a dimension of less than 2 mm.

17 Claims, 18 Drawing Sheets

(52) U.S. Cl.
CPC ................ *G02B 2027/0174* (2013.01); *G02B 2027/0187* (2013.01)

(58) Field of Classification Search
CPC .. G02B 2027/0187; G02B 5/32; G02B 26/10; G02B 27/0093; B82Y 20/00; G03H 2001/0224; G03H 2001/2207; G03H 2001/221; G03H 2001/2284; G03H 2225/10; G03H 2225/32; G03H 2226/05; G03H 1/2205; G03H 1/2294
See application file for complete search history.

(56) References Cited

U.S. PATENT DOCUMENTS

| | | | | |
|---|---|---|---|---|
| 2008/0062351 | A1* | 3/2008 | Handschy | G02F 1/133606 349/68 |
| 2013/0222384 | A1 | 8/2013 | Futterer | |
| 2015/0331297 | A1 | 11/2015 | Han et al. | |
| 2016/0313556 | A1* | 10/2016 | Futterer | G02F 1/292 |
| 2017/0123204 | A1 | 5/2017 | Sung et al. | |
| 2017/0299870 | A1* | 10/2017 | Urey | G02B 5/0242 |
| 2018/0003981 | A1* | 1/2018 | Urey | A61B 3/032 |
| 2018/0113311 | A1* | 4/2018 | Klug | H04N 13/344 |
| 2019/0018245 | A1* | 1/2019 | Cheng | G02B 27/0172 |
| 2019/0293939 | A1 | 9/2019 | Sluka | |

FOREIGN PATENT DOCUMENTS

| | | | |
|---|---|---|---|
| CN | 111175975 | A | 5/2020 |
| EP | 1418458 | A1 | 5/2004 |
| JP | 3785539 | B2 | 6/2006 |
| JP | 2013019978 | A | 1/2013 |
| WO | 2020263174 | A1 | 12/2020 |

OTHER PUBLICATIONS

Written Opinion of the International Searching Authority for International Application No. PCT/SG2022/050091 dated May 12, 2022, pp. 1-5.

Xiao et al., "On-Axis Near-Eye Display System Based on Directional Scattering Holographic Waveguide and Curved Goggle," Optics Express, vol. 27, No. 2, Jan. 21, 2019, pp. 1-10.

Cui et al., "All-Passive Transformable Optical Mapping Near-Eye Display," Scientific Reports, vol. 9, Apr. 15, 2019, pp. 1-8.

Wolfram Research, "Gaussian Lens Formula," Sep. 16, 2020, one page.

Bernard C. Kress, "Optical Architectures for Augmented-, Virtual-, and Mixed-Reality Headsets," Jan. 19, 2020, see chapter 18.6, Binary Focus Switch, pp. 200-201.

Lin et al., "Retinal Projection Head-Mounted Display," Frontiers of Optoelectronics, vol. 10, No. 1, 2017, pp. 1-8.

Ando et al., "Evaluation of HOE for Head Mounted Display," IS&T/SPIE Conference on Practical Holography XIII, San Jose, CA, U.S.A., SPIE, vol. 3637, Jan. 1999, pp. 110-118.

Sugawara et al., "Retinal Imaging Laser Eyewear with Focus-Free and Augmented Reality," Symposium Digest of Technical Papers, vol. 47, No. 1, 2016, pp. 164-167.

Ochiai et al., "Make Your Own Retinal Projector: Retinal Near-Eye Displays via Metamaterials," SIGGRAPH'18 Emerging Technologies, Aug. 12-16, 2018, pp. 1-2.

* cited by examiner

PRIOR ART

OPTICAL SYSTEM AND METHOD OF FORMING THE SAME

CROSS-REFERENCE TO RELATED APPLICATION

This application claims the benefit of priority of Singapore application No. 10202102665S filed Mar. 16, 2021, the contents of it being hereby incorporated by reference in its entirety for all purposes.

TECHNICAL FIELD

Various embodiments of this disclosure may relate to an optical system. Various embodiments of this disclosure may relate to a method of forming an optical system.

BACKGROUND

Offering one solution to mobile displays for wearable computing, near-eye displays (NEDs) or head-mounted displays have found multiple applications, such as scientific visualization, medical visualization, engineering processes, training, entertainment, gaming and so on. In particular, since the arrival of Google Glass and Oculus Virtual Reality (VR), NEDs have been treated as the most significant platform to provide virtual reality (VR) and augmented reality (AR) information. As such, this kind of displays has been attracting increasing attention. Increasingly, more advanced techniques such as freeform surfaces, diffraction gratings and geometric or holographic waveguides have been applied to develop more compact and high-performance NED systems. Many commercial products with high display performance can already be found in the market, such as Hololens from Microsoft, waveguide AR displays from Optinvent and Lumus, and freeform prism type near-eye displays from NED.

Most current commercial products provide only one focal plane in front of our eyes, while some of them provide multiple focal planes. For products which can only provide one focal plane, when the user views the virtual image, the crystalline lens should be adjusted to focus on this focal plane provided by near-eye displays. When the eye of user is focused on other depth planes without adjustment, the virtual image will be blurred. When the near-eye displays are employed in three-dimensional (3D) displays and AR applications, the situation becomes even worse. In most commercial near-eye displays, two-dimensional (2D) images with parallax are rendered to generate 3D scenes. When the user views the virtual objects, the accommodation plane and the convergence plane generally do not match with each other. Usability studies have confirmed that accommodation-convergence conflict is the main cause of viewer discomfort. This problem becomes more evident when using optical see-through near-eye displays in AR as the real image exists over a large range of distances. The virtual images cannot be clear when the user observes both the near and far real objects, due to the only one depth plane generated in space. This problem has drawn a lot of attention in both the academia and industry, and this issue is one of the most important topics in which many researchers have invested their effort to study.

In order to overcome this problem, various technologies have been developed and these can be classified into two categories. One category is to generate virtual 3D images which can provide both parallax and depth cues information. It includes technologies like multiple focal planes (such as Magic Leap One by Magic Leap), continuously tunable focal planes (such as the technologies provided by Facebook), wavefront reconstruction, and light field generation. Another category is to directly generate accommodation-free virtual images. With this approach, the reconstructed image is clear when the crystalline lens of the viewer's eyes focuses on a large range of distances. This kind of method is also called retinal projection display (RPD) (most of this kind of displays are achieved by Maxwellian view method). In this case, the virtual object can be directly imaged on the retina of the viewer's eye.

SUMMARY

Various embodiments may relate to an optical system. The optical system may include a light source configured to generate a light beam, the light beam being coherent or partially coherent. The optical system may also include a spatial light modulator configured to modulate a phase of the light beam. The optical system may further include an eyepiece for directing the modulated light beam to an eye of a viewer, the eyepiece arranged such that an optical distance between the spatial light modulator and a main plane of the eyepiece is greater than a focal length of the eyepiece. The spatial light modulator may include an active display area having a dimension of less than 2 mm.

Various embodiments may relate to a method of forming an optical system. The method may also include providing a light source configured to generate a light beam, the light beam being coherent or partially coherent. The method may further include providing a spatial light modulator configured to modulate a phase of the light beam. The method may also include arranging an eyepiece for directing the modulated light beam to an eye of a viewer, the eyepiece arranged such that an optical distance between the spatial light modulator and a main plane of the eyepiece is greater than a focal length of the eyepiece. The spatial light modulator may include an active display area having a dimension of less than 2 mm.

BRIEF DESCRIPTION OF THE DRAWINGS

In the drawings, like reference characters generally refer to the same parts throughout the different views. The drawings are not necessarily drawn to scale, emphasis instead generally being placed upon illustrating the principles of various embodiments. In the following description, various embodiments of the invention are described with reference to the following drawings.

DESCRIPTION

The following detailed description refers to the accompanying drawings that show, by way of illustration, specific details and embodiments in which the invention may be practised. These embodiments are described in sufficient detail to enable those skilled in the art to practise the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the optical systems are analogously valid for the other optical systems. Similarly, embodiments described in the context of a method are analogously valid for an optical system, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1:
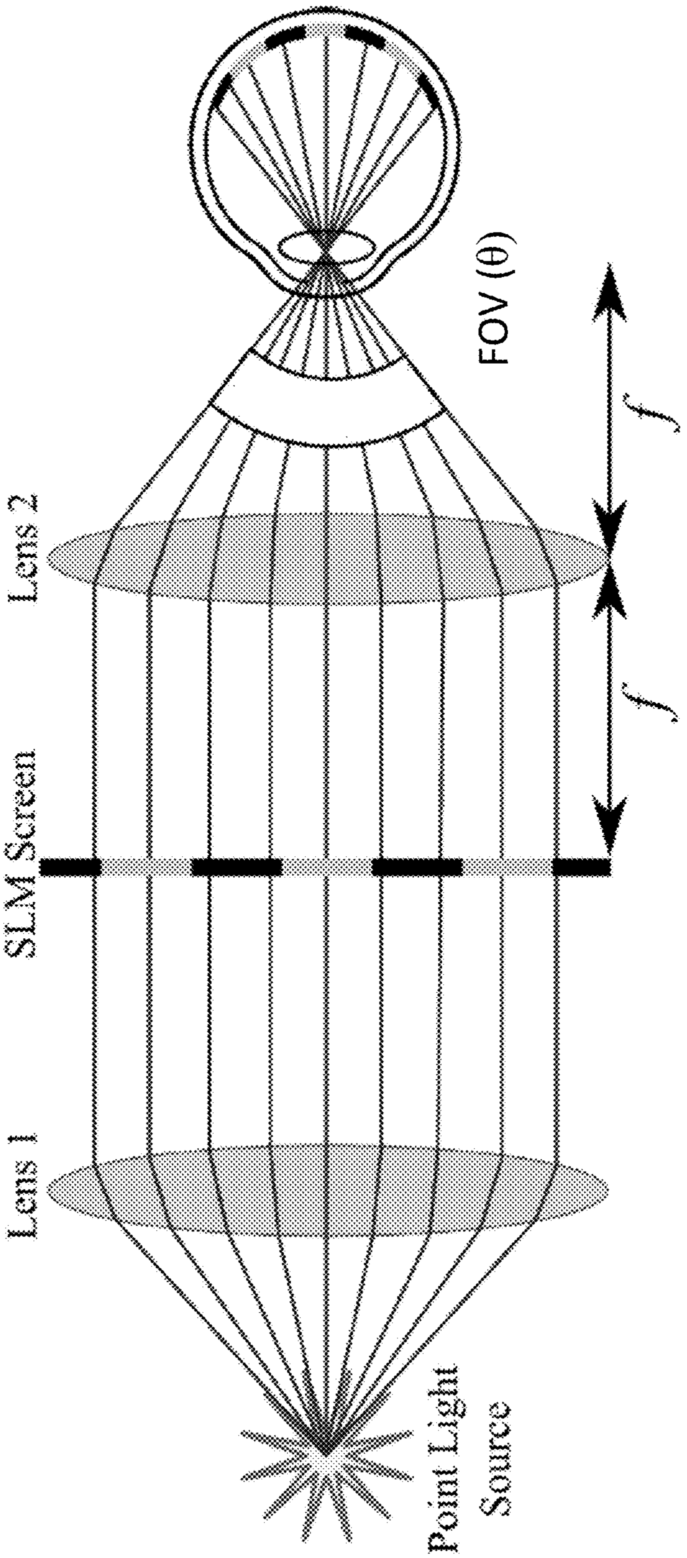
FIG. 1 (Prior Art)
FIG. 1 shows a schematic of a typical near-eye display using the Maxwellian view principle.

Most accommodation-free displays use the Maxwellian view principle, which is based on the experiment that James Clerk Maxwell conducted in 1868. FIG. 1 shows a schematic of a typical near-eye display using the Maxwellian view principle. Thin parallel beams are emitted from a spatial light modulator (SLM), which can be liquid-crystal display (LCD), digital mirror display (DMD) or liquid crystal on silicon (LCoS). The thin parallel beams converge at the center of the pupil due to the lens system, and are then directly projected onto the retina. The virtual image generated by the SLM can be viewed without ocular accommodation because all the beams pass through the center of the crystalline lens. Thus, the image pattern can be clear with an extremely long focal depth.

A previous method uses the HOE (Holographic Optical Element) to combine superimpositions of a virtual image on a real scene. The universal design compact eyewear of the retinal projection display (RPD) composed of a free-surface reflection mirror has also been presented. This kind of laser scanning approach introduces a digital micromirror device (DMD) as SLM. DMD often require high-cost driving circuit and complex projection optics. Another prior work has simplified the structure of eyepiece by using a transmissive mirror device, but the part of display devices still remains complex. Methods have also been provided to optimize the whole system. However, the size of current display devices, either LCD, OLCD, DMD or LCoS, is still too large compared to human eye's small etendue. On the other hand, the Maxwellian view principle involves a small size of the imaging point at the position of the eye pupil. Special, well-designed illumination structures are required to ensure a thin beam for each pixel, which makes the whole system complex and bulky.

One of the key challenges for the reported Maxwellian view display designs is that the light emitted from the point source has to be collimated in order to cover the whole area of a traditional SLM, which is normally of the size 1 cm-3 cm. After the light passing through the SLM, a similar aperture size lens is used to image the spatial light modulator into the pupil of the viewer. This expansion and reduction procedure makes the optics bulky and complicated. The limiting factor which prevents the display system from reducing the footprint and simplification is the size of the SLM. In order to reduce the size of the SLM, reduction of the pixel size is necessary. For traditional phase type SLM, the phase modulation is accumulated in the propagation path. As the refractive index of material is limited, in order to accumulate $2\pi$ phase, the optical thickness should be equal to or larger than one wavelength. This will prevent the SLM pixel from scaling down to submicron size for visible light operation.

Recently, the developments of metasurfaces are changing the way of modulating the light properties such as phase, amplitude and polarization etc. A metasurface, i.e. an array including subwavelength scale nanoantennas, can modulate the phase abruptly in the subwavelength scale. Various mechanisms for metasurfaces to modulate the phase of incident light have been reported, such as resonant phase, geometric phase (PB phase), waveguide phase generation etc. Compared to traditional optical components, metasurfaces have the advantages of ultrathin thickness, low aberrations and potential for low-cost fabrication through semiconductor processes. Various functions such as lens, beam bending and hologram have been realized based on metasurfaces.

In the area of displays, metasurfaces have been used to project both direct images and holograms. For direct imaging, by using the property of changing the resonance peak through the change of resonator geometry, high resolution color images based on metasurfaces have been produced. Due to the subwavelength feature size of the metasurfaces, they can achieve unique properties which cannot be obtained by traditional optics. For example, metasurface hologram can provide a very large viewing angle, while the high-order diffraction can be suppressed during the reconstruction process. The diffraction efficiency can be very high with a proper selection of the nanoantenna type and material. A 80% efficiency in a reflection type metasurface hologram at the wavelength of 825 nm has been reported. For transmission type metasurface holograms, 99% diffraction efficiency has been achieved at the wavelength of 1600 nm. Regarding the calculation of the computer generated metasurface holograms, traditional algorithms, such point source based coherent ray tracing, Fresnel propagation and Fourier transformation-based algorithms are still valid. For medium size holograms, thanks to the development of the Fast Fourier Transform (FFT) algorithm and powerful computers, real time hologram computation is possible and has been reported by many authors. One of the advantages of using holograms for display is that the lens functions can be embedded inside the hologram, which greatly reduces complexity of optics for correcting the aberrations of the display system.

Various embodiments may relate to a nanoantenna based spatial light modulator (NSLM) for accommodation free 3D display technologies, by taking advantages of the large viewing angle, small aperture, and fast computation speed of the computer-generated hologram.

Various embodiments may use a small aperture and small pixel size (e.g. <2 microns for the visible spectral range) phase type spatial light modulator, e.g. nanoantenna based spatial light modulator, as the imaging source to address the main problems currently existing in AR and real 3D display applications area. Various embodiments may promote the future widespread development of the VR/AR/3D display industry.

Figure 2:
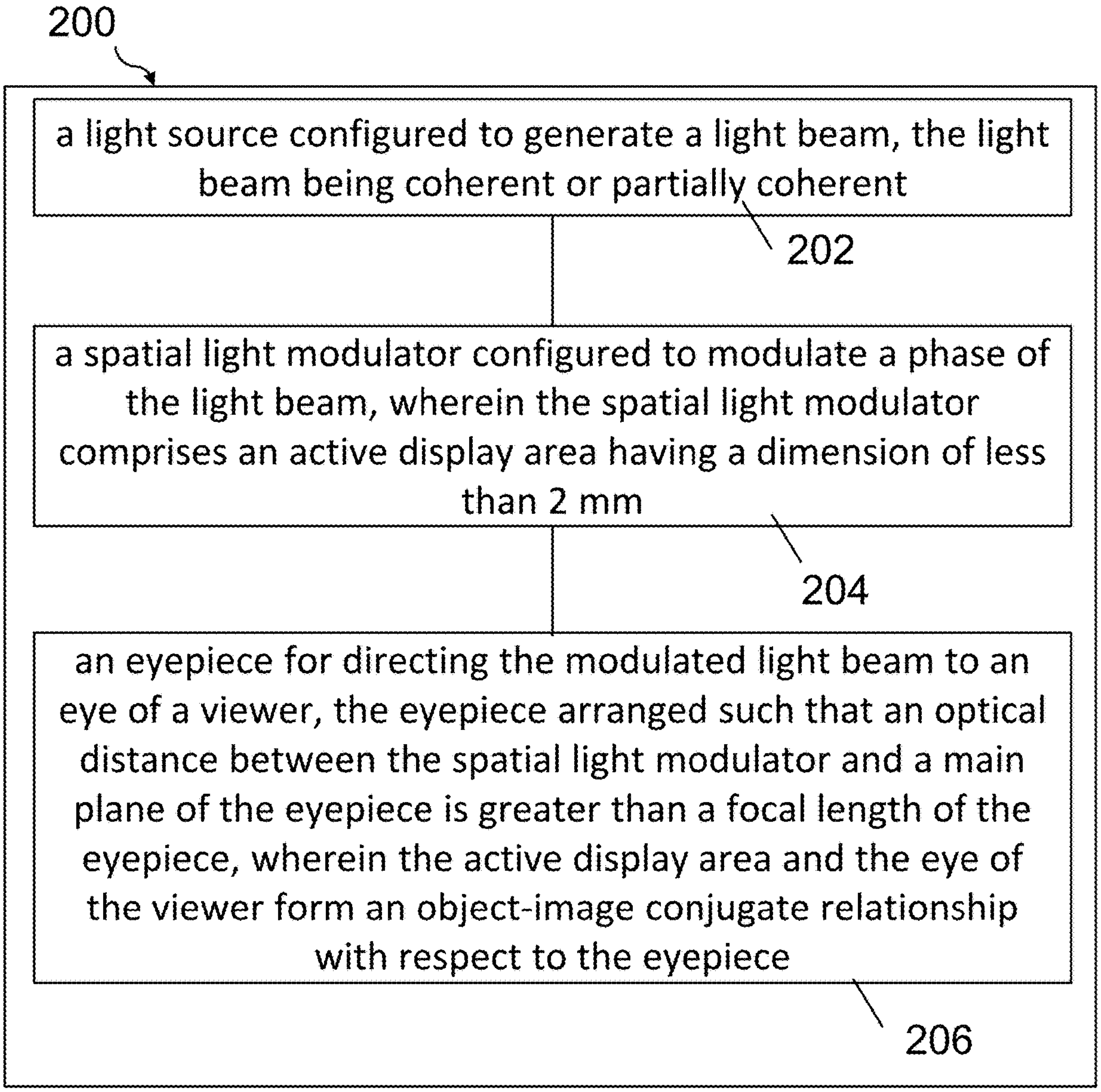
FIG. 2 is a general illustration of an optical system according to various embodiments.

FIG. 2 is a general illustration of an optical system 200 according to various embodiments. The optical system may include a light source 202 configured to generate a light beam, the light beam being coherent or partially coherent. The optical system may also include a spatial light modulator (SLM) 204 configured to modulate a phase of the light beam. The optical system may further include an eyepiece 206 for directing the modulated light beam (e.g. 414) to an eye of a viewer (e.g. a human), the eyepiece 206 arranged such that an optical distance between the spatial light modulator 204 and a main plane of the eyepiece 206 is greater than a focal length of the eyepiece 206. The spatial light modulator 204 may include an active display area (e.g. 704*a*) having a dimension of less than 2 mm.

In other words, various embodiments may relate to an optical system including a light source 202, a spatial light modulator 204, and an eyepiece 206. The spatial light modulator 204 and the eyepiece 206 may be so arranged such that an optical distance between the spatial light modulator 204 and a main plane of the eyepiece 206 is greater than a focal length of the eyepiece 206. The spatial light modulator 204 may include an active display area (e.g. 704*a*) having a dimension of less than 2 mm.

In the current context, "optical distance" may refer to the distance travelled by the modulated light beam.

In various embodiments, the spatial light modulator may have a pixel size less than or equal to 3 times a wavelength of light of the light beam. Various embodiments may provide around 20 degrees of view angle, which is acceptable. In various embodiments, the spatial light modulator may have a pixel size less than or equal a wavelength of light of the light beam. In various embodiments, the wavelength of light may be any wavelength selected from the visible range, i.e. from a range from 400 nm to 700 nm.

In various embodiments, the active display area (e.g. 704*a*) may have a square shape. In yet various other embodiments, the active display area (e.g. 704*a*) may have a circle shape or a rectangular shape. A dimension of the active display area (e.g. 704*a*) may refer to a length, diameter, or a width of the active display area (e.g. 704*a*). In various embodiments, each of the length and width of the active area may be of less than 2 mm. In various embodiments, a dimension of the active display area (e.g. 704*a*) may be less than 1.5 mm or less than 1 mm. In various embodiments, the active display area (e.g. 704*a*) may be less than 2 mm by 2 mm square.

In various embodiments, the spatial light modulator 204 may be a phase type spatial light modulator, i.e. a spatial light modulator (SLM) 204 configured to modulate the phase of the light beam.

In various embodiments, the eyepiece 206 may be configured to image the SLM 204 or aperture (active display area (e.g. 704*a*)) of the SLM 204 into the eye pupil of the viewer. The eye pupil may be at the conjugate position of the SLM 204. Since it is a thin beam image process, the depth of focus may be large and the reconstructed holographic image from the SLM 204 may then be projected onto the retina (at the back of the eye) of the viewer.

In various embodiments, the beam may be incident along a normal axis of the spatial light modulator 204 perpendicular to the active display area (e.g. 704*a*) of the spatial light modulator 204. The normal axis of the spatial light modulator 204 may not be parallel to a principal axis of the eyepiece 206.

In various embodiments, the pixel size may be less than 2 microns.

In various embodiments, the spatial light modulator 204 may be configured to generate a reconstructed holographic image based on a hologram loaded onto the spatial light modulator 204. The hologram may be a thin phase type hologram. A two-dimensional (2D) or three-dimensional (3D) image may be encoded with certain hologram computation algorithm. The hologram may serve as an image source.

In various embodiments, a distance between the reconstructed holographic image and the eyepiece 206 may be less than the focal length of the eyepiece 206.

In various embodiments, the active display area (e.g. 704*a*) and an image (e.g. 416) of the active display area (e.g. 704*a*) in the eye of the viewer (e.g. 412) may form an object-image conjugate relationship.

In various embodiments, the image (e.g. 416) of the active display area (e.g. 704*a*) may have a dimension of less than 2 mm. In various embodiments, the image (e.g. 416) of the active display area (e.g. 704*a*) may be less than 2 mm by 2 mm square.

In various embodiments, the optical system may further include a spatial filter configured to remove unwanted components of the modulated light beam. For instance, the spatial filter may be configured to remove unwanted light of zero-order diffraction as well as light leaking outside the active area.

In various embodiments, the optical system may include an eye tracking sub-system for tracking a movement of the eye of the viewer. The optical system may also include a scanning sub-system in electrical connection with the eye tracking sub-system. The scanning sub-system may be configured to adjust the optical system based on the movement of the eye of the viewer. The scanning sub-system may be configured to adjust the optical system based on one or more signals emitted by the eye tracking sub-system in response to a movement of the eye. The scanning sub-system may be mechanical or electronic. The scanning sub-system may be configured to change the path of the modulated light beam from the spatial light modulator based on the results or signals from the eye tracking sub-system.

In various embodiments, the optical system may also include an attenuator configured to reduce an energy of the modulated light beam.

In various embodiments, the eyepiece 206 may include one or more optical see-through elements. The optical see-through elements may be used for augmented reality (AR).

In various embodiments, the spatial light modulator 204 may be a transmissive spatial light modulator. In various other embodiments, the spatial light modulator 204 may be a reflective spatial light modulator.

In various embodiments, the light source 202 may be a laser source or a light emitting diode (LED). In various embodiments, the light beam from the light source may be required to be coherent or partially coherent in order to reconstruct the image from the hologram.

In various embodiments, the optical system may be a near-eye display system. In various embodiments, the optical system may be a binocular near-eye display system.

Figure 3:
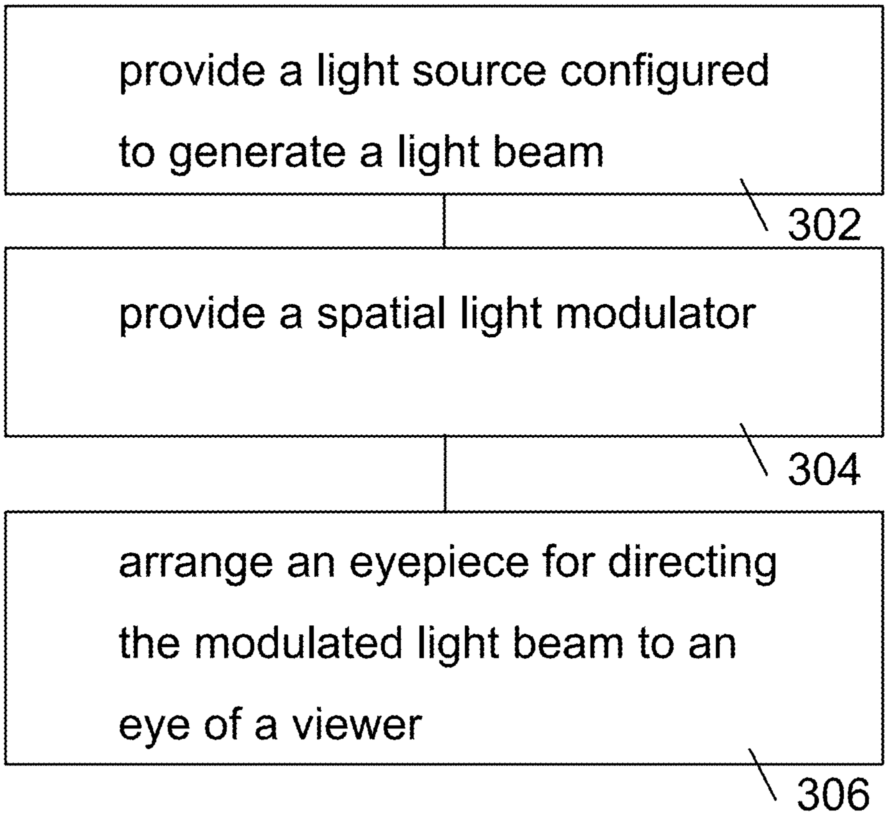
FIG. 3 is a general illustration of a method of forming an optical system according to various embodiments.

FIG. 3 is a general illustration of a method of forming an optical system according to various embodiments. The method may also include, in 302, providing a light source configured to generate a light beam, the light beam being coherent or partially coherent. The method may further include, in 304, providing a spatial light modulator configured to modulate a phase of the light beam. The method may also include, in 306, arranging an eyepiece for directing the modulated light beam to an eye of a viewer, the eyepiece arranged such that an optical distance between the spatial light modulator and a main plane of the eyepiece is greater than a focal length of the eyepiece. The spatial light modulator may include an active display area having a dimension of less than 2 mm.

In various embodiments, the beam may be incident along a normal axis of the spatial light modulator perpendicular to an optical display area (e.g. 504*a*) of the spatial light modulator. The normal axis of the spatial light modulator may not be parallel to a principal axis of the eyepiece.

In various embodiments, the spatial light modulator may be configured to generate a reconstructed holographic image based on a hologram loaded onto the spatial light modulator.

In various embodiments, a distance between the reconstructed holographic image and the eyepiece may be less than the focal length of the eyepiece.

In various embodiments, the active display area and an image of the active display area in the eye of the viewer may form an object-image conjugate relationship.

In various embodiments, the image of the active display area may have a dimension of less than 2 mm. In various embodiments, the image of the active display area may be less than 2 mm by 2 mm square.

In various embodiments, the optical system may further include a spatial filter configured to remove unwanted components of the modulated light beam.

In various embodiments, the method may include providing an eye tracking sub-system for tracking a movement of the eye of the viewer. The optical system may also include a scanning sub-system in electrical connection with the eye tracking sub-system. The scanning sub-system may be configured to adjust the optical system based on the movement of the eye of the viewer.

In various embodiments, the method may also include providing an attenuator configured to reduce an energy of the modulated light beam.

In various embodiments, the eyepiece may include one or more optical see-through elements.

In various embodiments, the spatial light modulator may be a transmissive spatial light modulator. In various other embodiments, the spatial light modulator may be a reflective spatial light modulator.

In various embodiments, the light source may be a laser source or a light emitting diode (LED).

Various embodiments may provide accommodation-free images (or virtual images with large focal depth) in front of our eyes by employing a small pixel size (e.g. nanoantenna based spatial light modulator with <2 micron pixel size for the visible spectral range) into optical see-through near-eye displays. The Maxwellian view method is commonly used to project the virtual images onto human's retina directly. However, the previous near-eye display methods using Maxwellian view principle had to introduce a complex illumination structure to make the light beam small for each pixel of the display panel before the beam enters the human eyes. The reason for that was the sizes of the current display devices, such as liquid-crystal display (LCD), digital mirror display (DMD) and liquid crystal on silicon (LCoS), were larger than the human pupil. These specially designed structures resulted in a bulkiness of the systems. Various embodiments may provide high resolution with small active display area. Thus, a near-eye display based on this technique may be much more compact compared with the traditional approaches. In this case, the aperture of the nanoantenna based spatial light modulator may be directly imaged on the human pupil without additional optical components.

As it is hard for human eye to adjust the crystalline lens to clearly observe an image located at a distance less than 25 cm from the viewer's eye, the principle of current commercially available near-eye displays is to magnify a small real image source and make the virtual image plane far away (normally >2 m) from the viewer by introducing an eyepiece lens. The real image sources in these displays can be an SLM, such as liquid-crystal display (LCD), organic light emitting diode (OLED), digital mirror display (DMD), and liquid crystal on silicon (LCoS). The optical distance between the SLM and the main plane of eyepiece should be less than the focal length of the eyepiece, which ensures that the magnified virtual image can be positioned far away. For 3D displays, accommodation-convergence (AC) conflict would happen.

Figure 4:
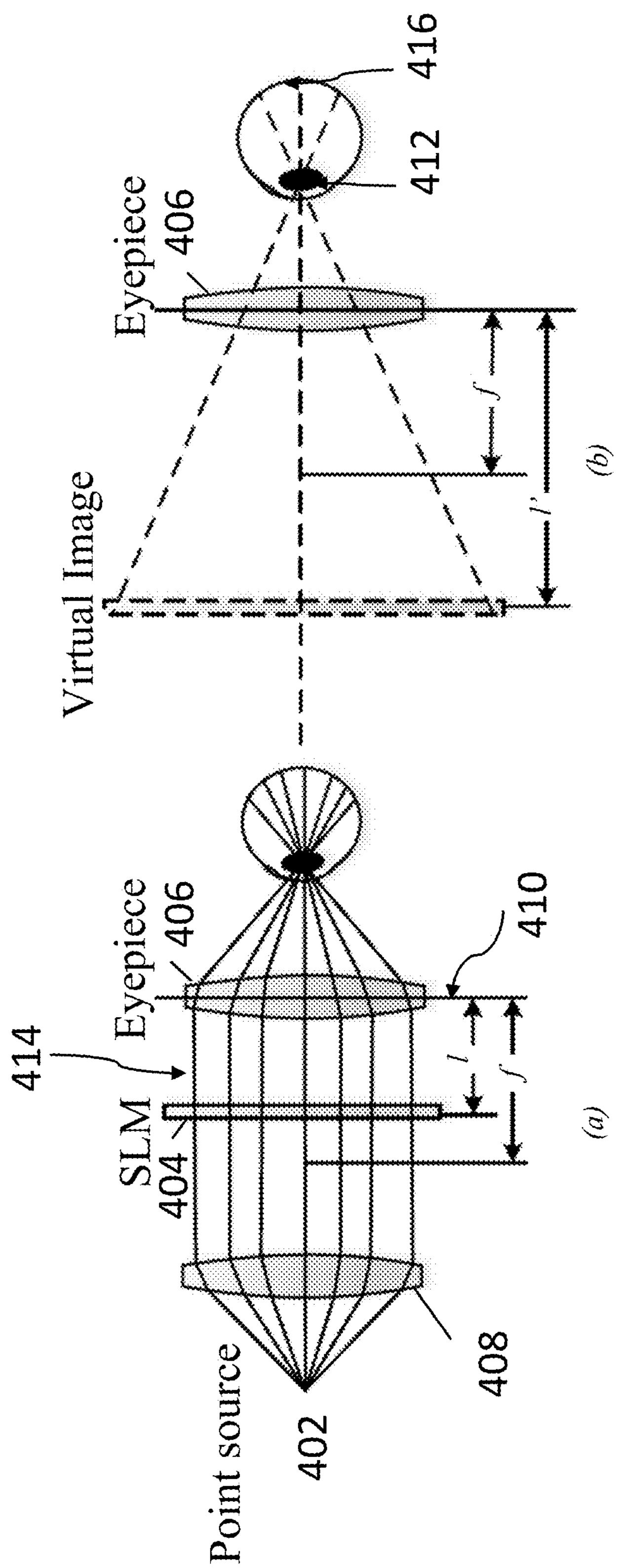
FIG. 4 shows (a) a schematic of a traditional Maxwellian-view display with traditional spatial light modulator (SLM) as an image display device; and (b) a schematic showing the position of the virtual image of the spatial light modulator by the function of the eyepiece.

To solve the AC conflict problem, accommodation-free method Maxwellian view display has been developed, and the image can be projected directly onto the user's retina. As shown in FIG. 4, in traditional Maxwellian view display approaches, special illumination structure should be employed to provide thin illumination on SLM panel (image source) to achieve the goal of accommodation-free display. FIG. 4 shows (a) a schematic of a traditional Maxwellian-view display with traditional spatial light modulator (SLM) 404 as an image display device; and (b) a schematic showing the position of the virtual image of the spatial light modulator 404 by the function of the eyepiece 406. The optical distance/between the SLM 404 and the main plane 410 of eyepiece 406 should also be less than the focal length f of the eyepiece 406 in order to let the user view the virtual image. A point source 402 provides the source of illumination and an eyepiece 406, e.g. a lens, directs the illumination to the SLM 404.

Figure 5:
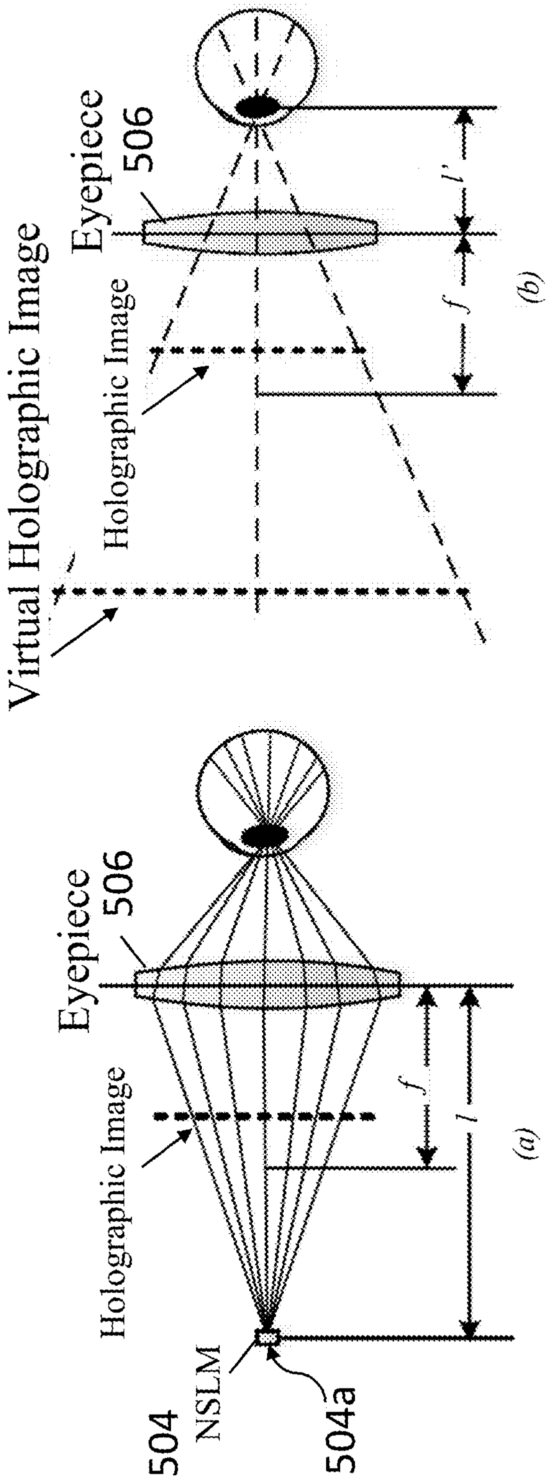
FIG. 5 shows (a) a schematic showing part of an optical system including a nano-antenna spatial light modulator (NSLM) and an eyepiece according to various embodiments; and (b) a schematic showing the positions of the holographic image and the virtual holographic image by the function of the eyepiece according to various embodiments.

Different from the traditional structure, various embodiments may include a light source, a small aperture and a small pixel size (e.g. <2 microns for the visible spectral range) phase type spatial light modulator, e.g. nano-antenna SLM (NSLM), and an eyepiece. The light source can be a laser source, a light emitting diode (LED), or any other coherent or partially coherent light source. FIG. 5 shows (a) a schematic showing part of an optical system including a nano-antenna spatial light modulator (NSLM) 504 and an eyepiece 506 according to various embodiments; and (b) a schematic showing the positions of the holographic image and the virtual holographic image by the function of the eyepiece 506 according to various embodiments.

The optical distance l between the NSLM 504 and the main plane of the eyepiece 506 may be larger than the focal length f of the eyepiece 506. A computer generated hologram in which a desired image is encoded may be loaded onto the small-pixel size SLM 504. The desired image can be projected from the hologram to the image plane located at a position within the focal length range (i.e. labelled as holographic image) when the NSLM 504 is illuminated with the light source (not shown in FIG. 5). The conjugate image size of the NSLM 504 may be much smaller than the viewer's pupil size, which preferably should be less than 1 mm. The pixel size of NSLM 504 may be <2 microns for the visible spectral range, in order to achieve large viewing angle and eliminate high order diffraction.

The requirement of the optical distance between the NSLM 504 and the eyepiece 506 may be because the image plane provided by NSLM 504 is not at the position of NSLM 506 in our system. As shown in FIG. 4 and FIG. 5, the image position of an SLM 404 in a traditional structure is far away from the eyepiece 406, while the image position of the small-pixel size SLM (NSLM) 504 may be set at the position of human pupil. The object length and the image length in both FIG. 4 and FIG. 5 may satisfy Gaussian lens formula. The position of the NSLM 504 and the viewer's eye pupil (i.e. eye pupil of the viewer) should be conjugated by the function of eyepiece 506. In other words, the eye pupil of the viewer may be at the conjugate position of the spatial light modulator 504. The thin film images process may have a large depth of focus. A hologram fringe may be present on the spatial light modulator 504, and the holographic image may be reconstructed from the hologram fringe. The reconstructed holographic image (i.e. labelled as holographic image in FIG. 5) from the spatial light modulator 504 may then be projected onto the retina of the eye of the viewer as the virtual holographic image (i.e. labelled as virtual holographic image in FIG. 5). There may no image at the spatial light modulator, only interference fringes. The size requirement of the NSLM's conjugate image may be because it should be much smaller than human pupil (normally with the size of 2 mm to 8 mm) in order to provide accommodation-free images on the viewer's retina.

Figure 6:
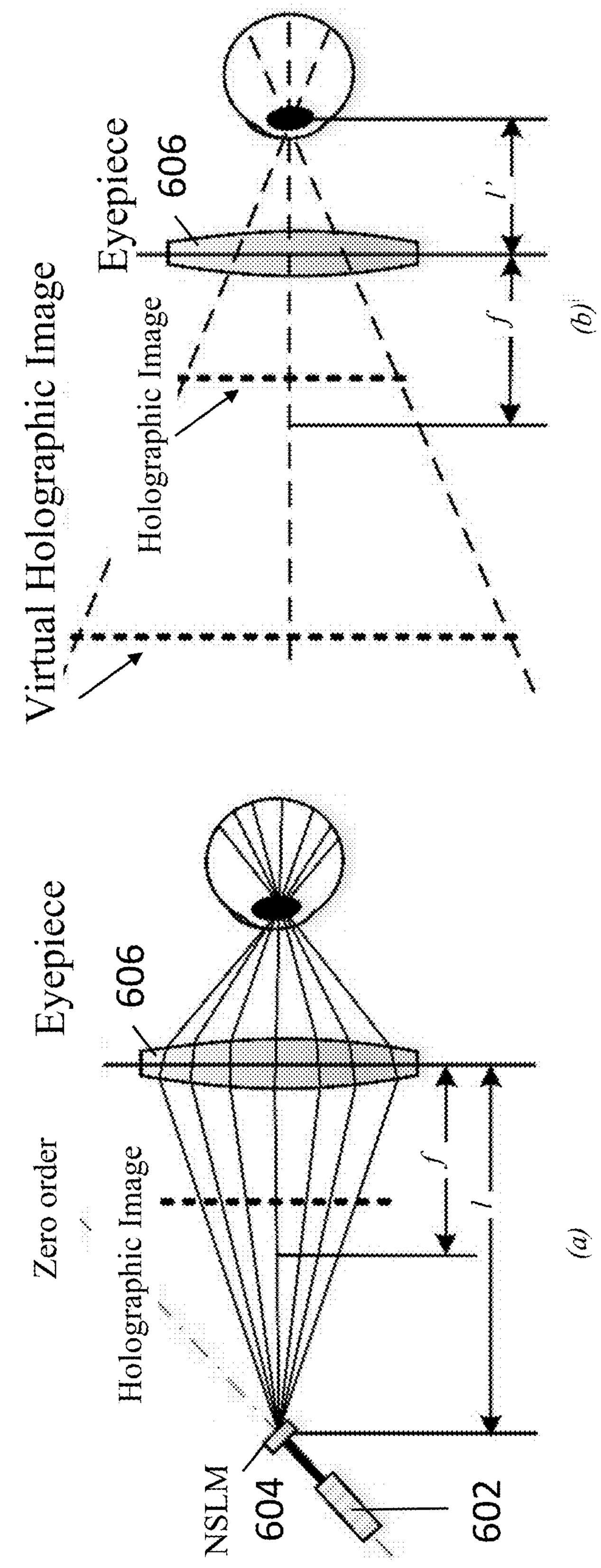
FIG. 6 shows (a) an optical system with tilted nano-antenna spatial light modulator (NSLM) as a hologram projection device according to various embodiments; and (b) a schematic showing the positions of the holographic image and the virtual holographic image by the function of the eyepiece according to various embodiments.

The collimated light may be incident to the NSLM normally. FIG. 6 shows (a) an optical system with tilted nano-antenna spatial light modulator (NSLM) 604 as a hologram projection device according to various embodiments; and (b) a schematic showing the positions of the holographic image and the virtual holographic image by the function of the eyepiece 606 according to various embodiments. As shown in FIG. 6, the optical system may include a light source 602 and light from the light source 602 may incident normally on the NSLM 604. The normal direction of the NSLM 604 may be at an angle off-axis with respect to the principal axis of the eye piece 606 as shown in FIG. 6, so that the zero order light does not enter the field of view of the display system. The image quality in this case can be greatly improved.

In various embodiments, optical see-through elements can be used in designing the eyepiece, which can be applied in augmented reality. Various embodiments may include reflective or transmissive small-pixel size SLM. Various embodiments may also include an attenuator to reduce the energy of illumination. Various embodiments may employ an eye tracking system or sub-system to increase the system adaptability for different types of users.

Figure 7:
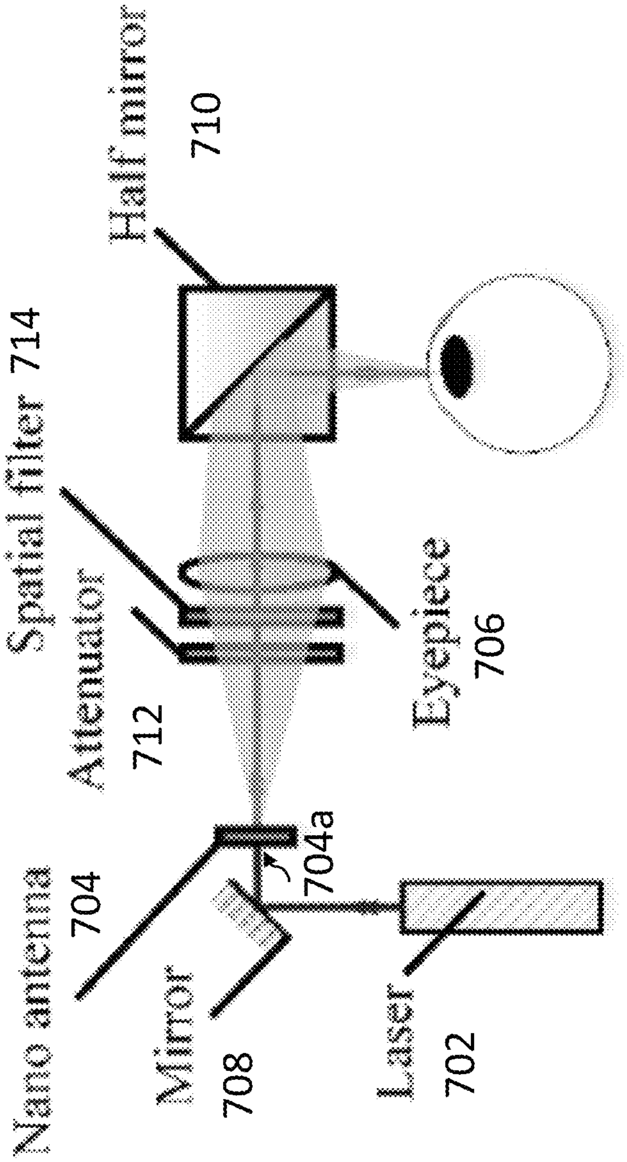
FIG. 7 shows a schematic of a near-eye display system including a transmissive nano-antenna spatial light modulator (NSLM) according to various embodiments.

FIG. 7 shows a schematic of a near-eye display system including a transmissive nano-antenna spatial light modulator (NSLM) 704 according to various embodiments. The NSLM 704 may be also referred to as a nano antenna as indicated in FIG. 7. A transmissive hologram projecting the required virtual image may be fabricated on a base plate to act as a static NSLM 704. Alternatively, dynamic virtual images or a virtual video can be generated, when dynamic NSLM is employed to change the pattern on the display device. A laser (or LED) may be employed as a light source 702 to illuminate the NSLM 704, and when the NSLM 704 is illuminated by the laser (or LED), a virtual image is generated with a large field of view from the hologram loaded on the NSLM 704. The NSLM 704 may be configured to modulate the phase of the light beam from the light source 702 to generate a modulated light beam.

The mirror 708 may be an optional element in the design of the system based on the outlook to the near-eye display. The mirror 708 may direct the light beam from the light source 702 to the NSLM 704. The eyepiece 706 may be designed to image the aperture of the active display area of the NSLM 704 to the eye of the viewer, i.e. eye pupil of the viewer. The eyepiece 706 may be configured to direct the modulated light beam to the eye of the viewer. The relationship between the distance from the NSLM 704 to the eyepiece 706, and from the eyepiece 706 to the human eye, as well as the focal length of the eyepiece 706 may be based on the Gaussian lens formula. As the aperture of the active display area is very small compared to the eye pupil, the hologram of the virtual image can be projected directly on the retina. The whole system may be much more compact compared with the previous works that aim to solve the blur image problem in traditional near-eye displays.

The distance between the NSLM 704 and the eyepiece 706 may be adjusted to control the viewing angle and the angular resolution of the near-eye display system. In order to obtain good performance, the eyepiece 706 may be required to be well designed. In various embodiments, the eyepiece 706 may be or may include a Fresnel lens, a doublet lens, a triplet lens, an aspherical singlet lens, a prism or optical element with a freeform surface, or a waveguide. Also, owning to the small size of the active display area, the off-axis aberration is not significant, thus, the design of the eyepiece 706 may also be simplified compared to the traditional designs based on LCD, DMD, or LCoS while maintaining the same performance. Various embodiments may include a half mirror (beam splitter) 710 inserted between the eyepiece 706 and the human eye, which allow the user to observe the virtual image along with the real world. Also, the half mirror 710 may be designed along with the eyepiece 706, which has already been commercialized in the market as an important element in optical see-through near-eye displays. For instance, a freeform prism can be designed, and a half mirror film can be coated in order to maintain the AR effect. The optical system may also include an attenuator 712, which can be inserted along the optical path between the light source 702 and the eye of the viewer, and which may be used to reduce the energy of the light source 702 to protect the eye of the viewer. In various embodiments, the energy of the light source 702 and the diffraction efficiency of the NSLM 704 can be well controlled to let the human eye receive a safe power. In order to eliminate possible unwanted light from the zero-order diffraction as well as light leaking outside of the active area, various embodiments may include a high-pass spatial filter 714.

Based on the system shown in FIG. 7, one display channel for one eye can be obtained. When the user looks through the half mirror 710 in front of the eye, he/she can observe the real world. With the help of the eyepiece 706 and the small size of the active display area, the virtual image generated by the holographic pattern on the NSLM 704 may be projected onto the retina directly. Regardless where the crystalline lens of the viewer's eye is focused, far or near, the virtual image may be clear, which can solve the image blur problem.

Figure 8:
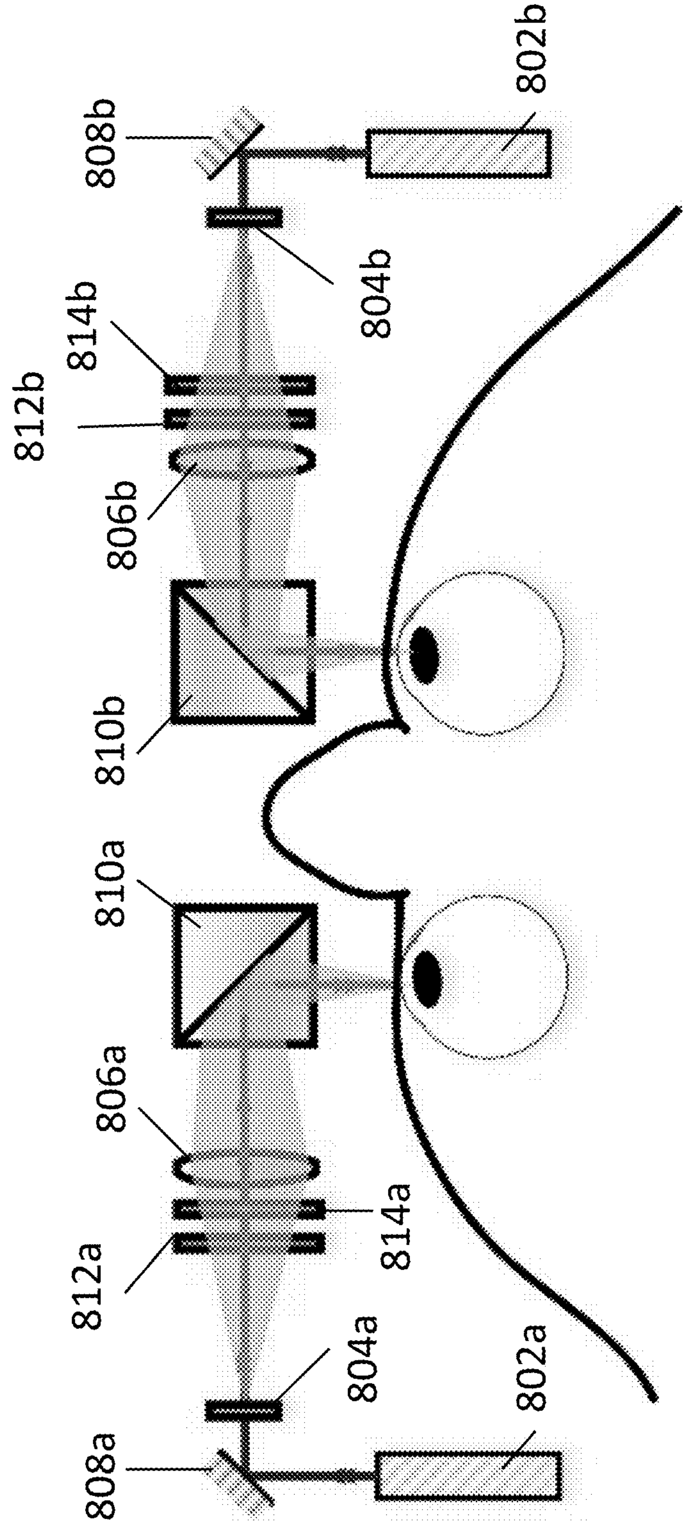
FIG. 8 shows a schematic of a binocular near-eye display system according to various embodiments.

FIG. 8 shows a schematic of a binocular near-eye display system according to various embodiments. The binocular near-eye display system may include a first light source 802*a* configured to generate a light beam. The system may also include a first spatial light modulator 804*a* configured to modulate the phase of the light beam generated by the first light source 802*a*. The system may also include a first mirror 808*a* configured to direct the light beam from the first light source 802*a* to the first spatial light modulator 804*a*. The system may further include a first eyepiece 806*a* for directing the modulated light beam to a (left) eye of a viewer. The system may additionally include a first half mirror 810*a* configured to direct the modulated light beam from the first eyepiece 806*a* to the (left) eye of a viewer. The system may also include a first attenuator 812*a* arranged along the optical path between the light source 802*a* and the (left) eye of the viewer, and configured to reduce the energy of the light beam or modulated light beam. The system may additionally include a first high-pass spatial filter 814*a* arranged along the optical path between the light source 802*a* and the (left) eye of the viewer, and configured to remove unwanted components of the light beam or modulated light beam.

The binocular near-eye display system may include a second light source 802*b* configured to generate a further light beam. The system may also include a second spatial light modulator 804*b* configured to modulate the phase of the further light beam generated by the second light source 802*b*. The system may also include a second mirror 808*b* configured to direct the further light beam from the second light source 802*b* to the second spatial light modulator 804*b*. The system may further include a second eyepiece 806*b* for directing the modulated further light beam to a (right) eye of a viewer. The system may additionally include a second half mirror 810*b* configured to direct the modulated further light beam from the second eyepiece 806*b* to the (right) eye of a viewer. The system may also include a second attenuator 812*b* arranged along the optical path between the further light source 802*a* and the (right) eye of the viewer, and configured to reduce the energy of the further light beam or modulated further light beam. The system may additionally include a second high-pass spatial filter 814*b* arranged along the optical path between the light source 802*a* and the (right) eye of the viewer, and configured to remove unwanted components of the further light beam or modulated further light beam.

The distance relationship among the optical elements can be adjusted according to the industry design and the mechanical requirements of the near-eye display system.

Figure 9:
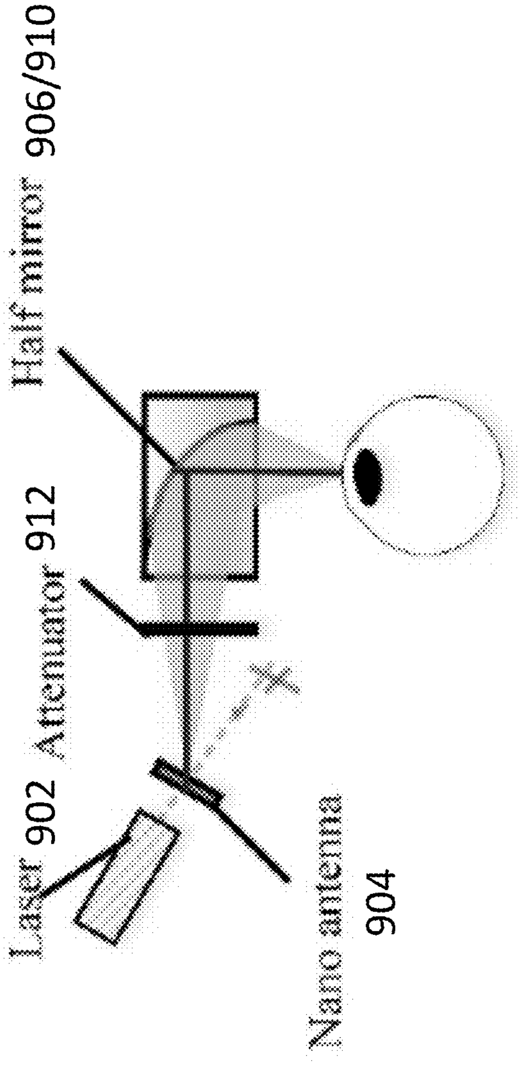
FIG. 9 shows a schematic of a near-eye display system based on off-axis illumination using a transmissive spatial light modulator (SLM) according to various embodiments.

Off-axis illumination is another method to eliminate the unwanted zero-order diffraction and direct transmission from the laser (or LED) which is shown in FIG. 9. FIG. 9 shows a schematic of a near-eye display system based on off-axis illumination using a transmissive spatial light modulator (SLM) 904 according to various embodiments. The SLM 904 may be a nano-antenna spatial light modulator (NSLM). As shown in FIG. 9, there may not be a requirement for a mirror between the light source 902 (e.g. a laser source or LED) and the NSLM 904, and the light source 902 may directly illuminate the NSLM 904. The optical axis of the light source and the NSLM 904 may not be parallel to the principal or optical axis of the eyepiece 906. Thus, the unwanted zero-order diffraction and direct transmission from the light source 902 can be controlled not to enter the view of the eye of the viewer. As shown in FIG. 9, an optional attenuator 912 may be employed. Here, a freeform surface 906 (of e.g. a prism) may be used to image the active display area of NSLM 904 onto the eye pupil. The surface with focal power may also be coated by a half-mirror film 910 (for AR applications), and the auxiliary optical component (not shown in FIG. 9) can be added to correct the diopter of the human eye, which can be used by the users with myopia and hypermetropia.

Figure 10:
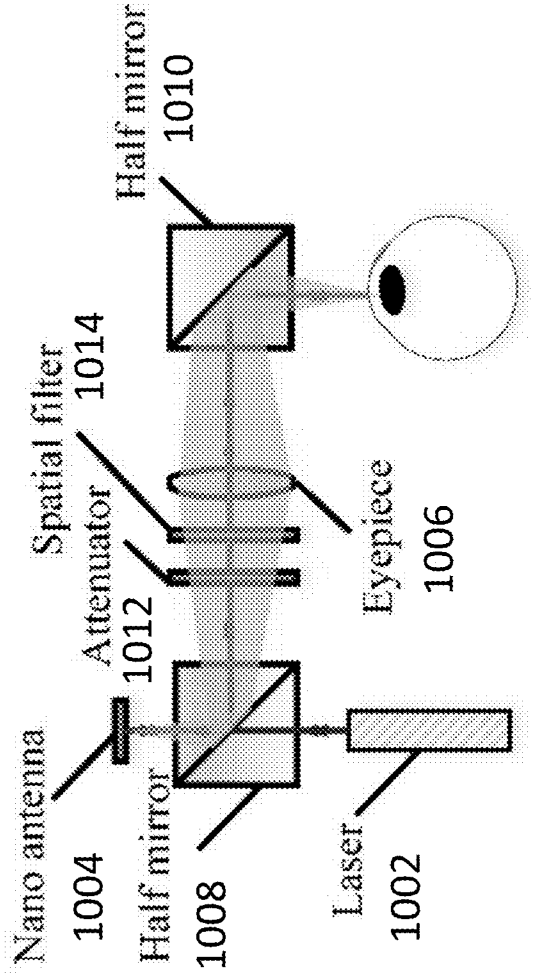
FIG. 10 shows a schematic of a near-eye display system based on off-axis illumination using a reflective spatial light modulator (SLM) according to various embodiments.

Apart from the transmissive NSLM, a reflective NSLM can also be used in the design of a near-eye display system. FIG. 10 shows a schematic of a near-eye display system based on off-axis illumination using a reflective spatial light modulator (SLM) 1004 according to various embodiments. The near-eye display system may include a light source 1002, such as a laser source or light emitting diode, configured to generate a light beam. The system may also include a spatial light modulator 1004 (e.g. a nano-antenna spatial light modulator (NSLM) including one or more nano-antennas) configured to modulate the phase of the light beam generated by the light source 1002. The spatial light modulator 1004 may be a reflective spatial light modulator, and may be configured to reflect the incoming light beam from the light source 1002 to generate the modulated light beam. The light beam may illuminate the active display area of the spatial light modulator 1002, and a virtual image may appear in reflection by the digital hologram generated on the spatial light modulator 1004. The system may further include an eyepiece 1006 for directing the modulated light beam to an eye of a viewer. The system may also include a first half mirror 1008 configured to allow the light beam from the light source 1002 to pass through to the spatial light modulator 1004, and configured to direct the modulated light beam reflected from the spatial light modulator 1004 to the eyepiece 1006. The system may additionally include a second half mirror 1010 configured to direct the modulated light beam from the eyepiece 1006 to the eye of the viewer. The second half mirror 1010 may include a polarizing film, and the polarizing film may match a polarization state of the light source 1002. The system may also include an attenuator 1012 arranged along the optical path between the light source 1002 and the eye of the viewer, and configured to reduce the energy of the light beam or modulated light beam for protecting the eye of the viewer. The system may additionally include a filter 1014 arranged along the optical path between the light source 1002 and the eye of the viewer, and configured to remove unwanted components of the light beam or modulated light beam, e.g. to eliminate or reduce the unwanted direct transmission from the light source 1002 as well as zero-order diffraction speckle.

Figure 11:
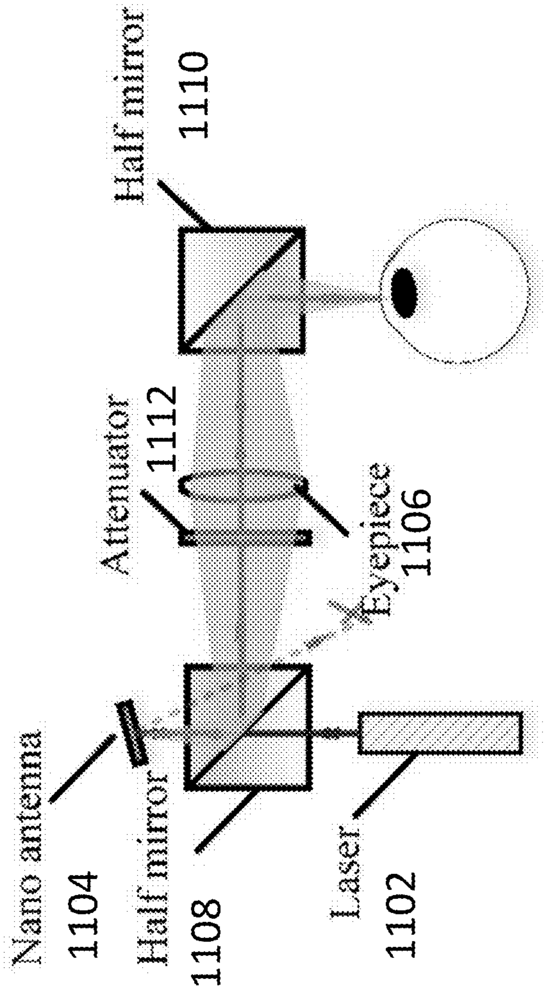
FIG. 11 shows a schematic of a near-eye display system based on off-axis illumination using a reflective spatial light modulator (SLM) according to various embodiments.
Figure 12:
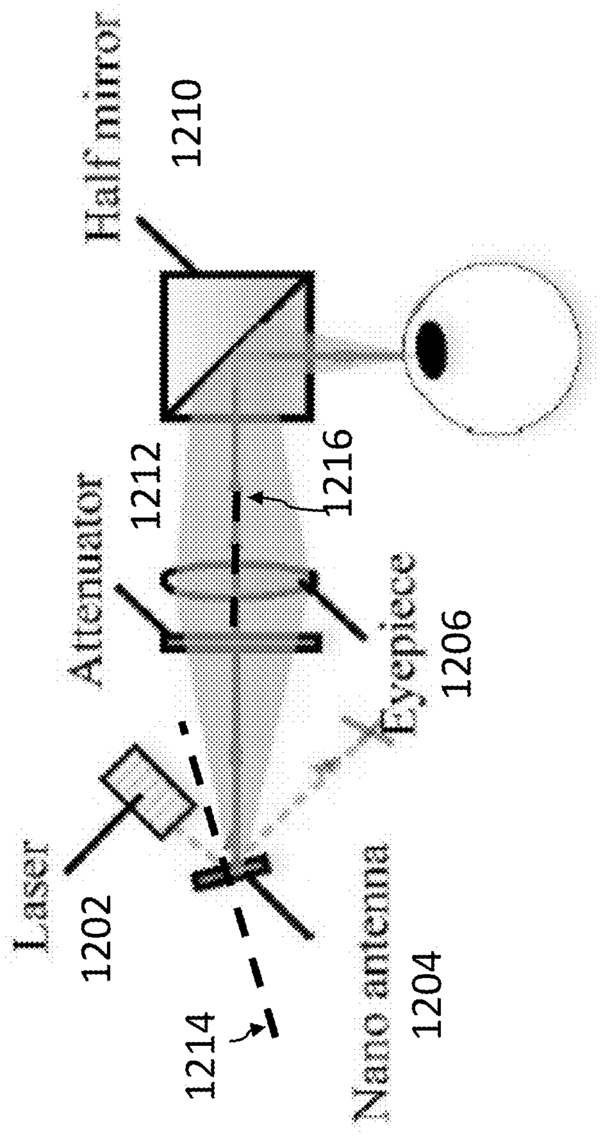
FIG. 12 shows a schematic of a near-eye display system based on off-axis illumination using another reflective spatial light modulator (SLM) according to various embodiments.

Off-axis illumination can also be used to eliminate the unwanted direct transmission and the zero-order diffraction, as illustrated by FIGS. 11-12. The spatial light modulator may be tilted to ensure that unwanted direct transmission and the zero-order diffraction are not viewed by the human eye.

FIG. 11 shows a schematic of a near-eye display system based on off-axis illumination using a reflective spatial light modulator (SLM) 1104 according to various embodiments.

The near-eye display system may include a light source 1102, such as a laser source or light emitting diode, configured to generate a light beam. The system may also include a spatial light modulator 1104 (e.g. a nano-antenna spatial light modulator (NSLM) including one or more nano-antennas) configured to modulate the phase of the light beam generated by the light source 1102. The spatial light modulator 1104 may be a reflective spatial light modulator, and may be configured to reflect the incoming light beam from the light source 1102 to generate the modulated light beam. The spatial light modulator 1104 may be arranged off-axis. The normal of the spatial light modulator 1104 may not be parallel to the incoming light beam. The system may further include an eyepiece 1106 for directing the modulated light beam to an eye of a viewer. The system may also include a first half mirror 1108 configured to allow the light beam from the light source 1102 to pass through to the spatial light modulator 1104, and configured to direct the modulated light beam reflected from the spatial light modulator 1104 to the eyepiece 1106. The system may additionally include a second half mirror 1110 configured to direct the modulated light beam from the eyepiece 1106 to the eye of the viewer. The system may also include an attenuator 1112 arranged along the optical path between the light source 1102 and the eye of the viewer, and configured to reduce the energy of the light beam or modulated light beam for protecting the eye of the viewer. The first half mirror 1108 which is inserted between the spatial light modulator 1104 and the light source 1102 may be removed, and the light source 1102 may be aligned off-axis, as shown in FIG. 12.

FIG. 12 shows a schematic of a near-eye display system based on off-axis illumination using another reflective spatial light modulator (SLM) 1204 according to various embodiments.

The near-eye display system may include a light source 1202, such as a laser source or light emitting diode, configured to generate a light beam. The system may also include a spatial light modulator 1204 (e.g. a nano-antenna spatial light modulator (NSLM) including one or more nano-antennas) configured to modulate the phase of the light beam generated by the light source 1202. The spatial light modulator 1204 may be a reflective spatial light modulator, and may be configured to reflect the incoming light beam from the light source 1202 to generate the modulated light beam. The system may further include an eyepiece 1206 for directing the modulated light beam to an eye of a viewer. The spatial light modulator 1204 may be arranged off-axis. The normal of the spatial light modulator 1204 may not be parallel to the incoming light beam. Also, the normal axis 1214 of the spatial light modulator 1204 may not be parallel to the principal axis 1216 of the eye piece 1206. The system may additionally include a half mirror 1210 configured to direct the modulated light beam from the eyepiece 1206 to the eye of the viewer. The system may also include an attenuator 1212 arranged along the optical path between the light source 1202 and the eye of the viewer, and configured to reduce the energy of the light beam or modulated light beam for protecting the eye of the viewer.

Figure 13:
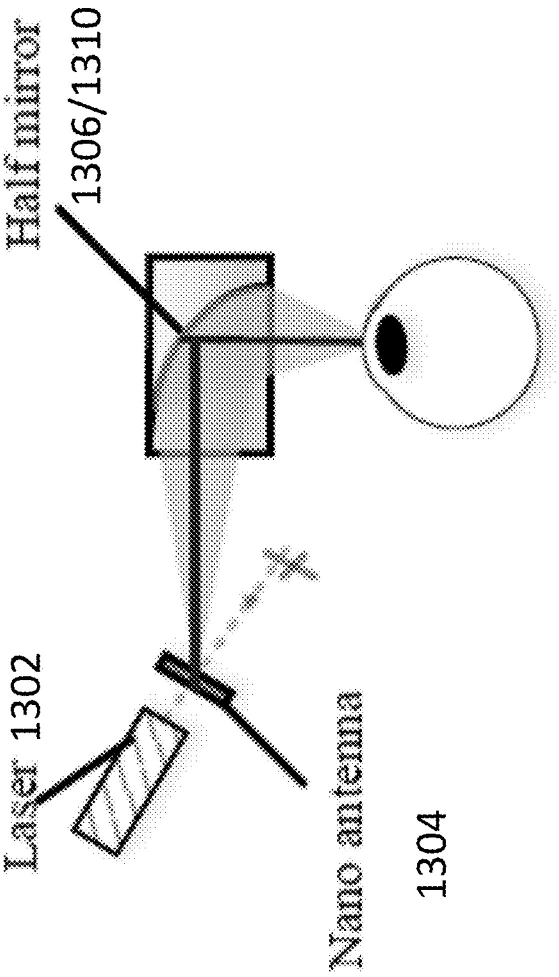
FIG. 13 shows a schematic of a near-eye display system based on off-axis illumination using a transmissive spatial light modulator (SLM) without an attenuator according to various embodiments.

In order to simplify the whole system, the power of the laser (or LED) or other kinds of illumination subsystems can be controlled to provide a safe and sufficient illumination suitable for human eyes. Various embodiments may not require an attenuator. FIG. 13 shows a schematic of a near-eye display system based on off-axis illumination using a transmissive spatial light modulator (SLM) 1304 without an attenuator according to various embodiments.

The SLM 1304 may be a nano-antenna spatial light modulator (NSLM). As shown in FIG. 13, the light source 1302 may directly illuminate the NSLM 1304. The optical axis of the light source 1302 and the NSLM 1304 may not be parallel to the principal or optical axis of the eyepiece 1306. Thus, the unwanted zero-order diffraction and direct transmission from the light source 1302 can be controlled not to enter the view of the eye of the viewer. Here, a freeform surface 1306 may be used to image the active display area of NSLM 1304 onto the eye pupil. The surface with focal power may also be coated by a half-mirror film 1310.

Figure 14:
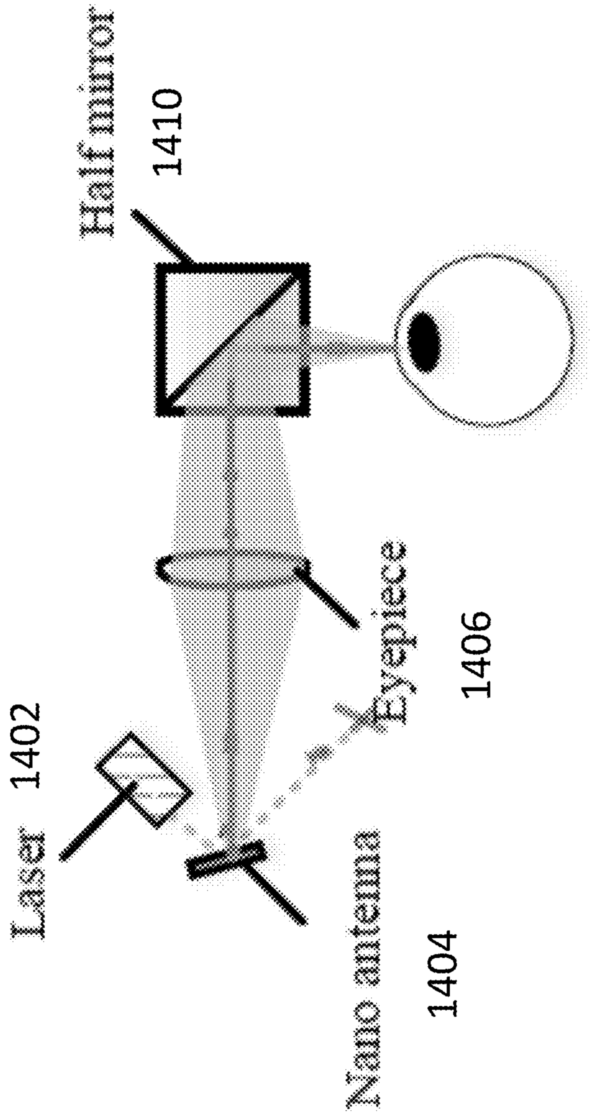
FIG. 14 shows a schematic of a near-eye display system based on off-axis illumination using a reflective spatial light modulator (SLM) without an attenuator according to various embodiments.

FIG. 14 shows a schematic of a near-eye display system based on off-axis illumination using a reflective spatial light modulator (SLM) 1404 without an attenuator according to various embodiments.

The SLM 1404 may be a nano-antenna spatial light modulator (NSLM). The near-eye display system may include a light source 1402, such as a laser source or light emitting diode, configured to generate a light beam. The system may also include a spatial light modulator 1404 (e.g. a nano-antenna spatial light modulator (NSLM) including one or more nano-antennas) configured to modulate the phase of the light beam generated by the light source 1402. The spatial light modulator 1404 may be a reflective spatial light modulator, and may be configured to reflect the incoming light beam from the light source 1402 to generate the modulated light beam. The system may further include an eyepiece 1406 for directing the modulated light beam to an eye of a viewer. The spatial light modulator 1404 may be arranged off-axis. The normal of the spatial light modulator 1404 may not be parallel to the incoming light beam. Also, the normal axis of the spatial light modulator 1404 may not be parallel to the principal axis of the eye piece 1406. The system may additionally include a half mirror 1410 configured to direct the modulated light beam from the eyepiece 1406 to the eye of the viewer.

In the systems shown in FIGS. 13 and 14, the SLM and the light source together may provide the display source, and the virtual image may be projected onto the retina with the help of the eyepiece. The eyepiece may be designed either as an occlusive or an optical see-through, which can be applied in virtual reality (VR) and augmented reality (AR) systems, respectively.

Figure 15:
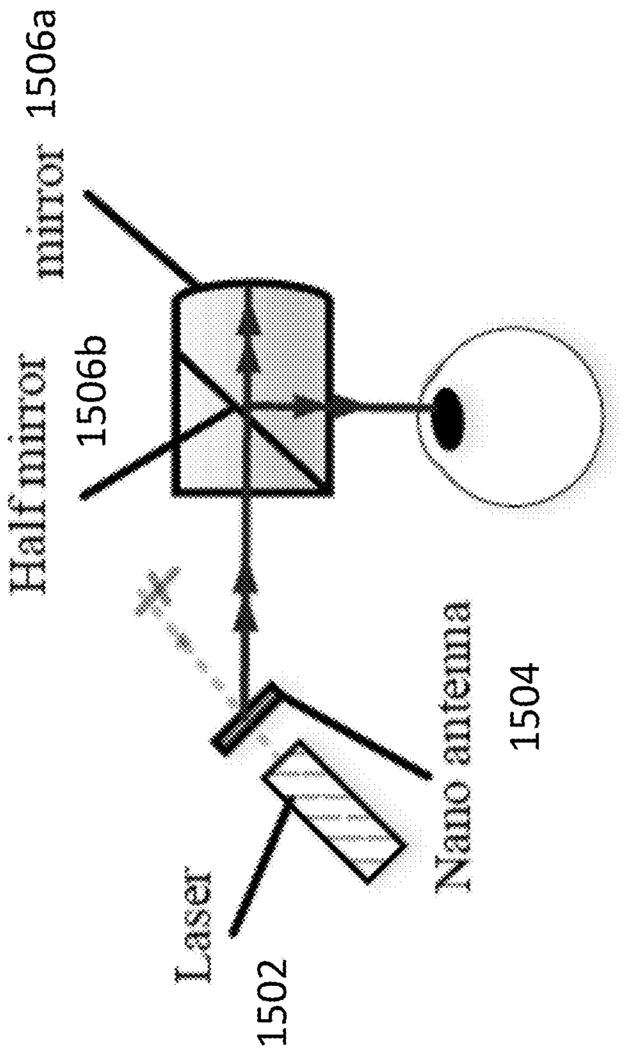
FIG. 15 shows a schematic of a near-eye display system based on off-axis illumination using a transmissive spatial light modulator (SLM) without an attenuator according to various embodiments.

FIG. 15 shows a schematic of a near-eye display system based on off-axis illumination using a transmissive spatial light modulator (SLM) 1504 without an attenuator according to various embodiments.

The SLM 1504 may be a nano-antenna spatial light modulator (NSLM). As shown in FIG. 15, the light source 1502 may directly illuminate the NSLM 1504. The optical axis of the light source 1502 and the NSLM 1504 may not be parallel to the principal or optical axis of the eyepiece. The eyepiece may include a curved mirror 1506*a* and a half mirror 1506*b*. The modulated light beam from the spatial light modulator 1504 may impinge and be reflected by the curved mirror 1506*a*, before impinging and being reflected by the half mirror 1506*b* to the eye of the viewer. The light with the information of virtual image can be projected onto retina through the eye pupil.

Figure 16:
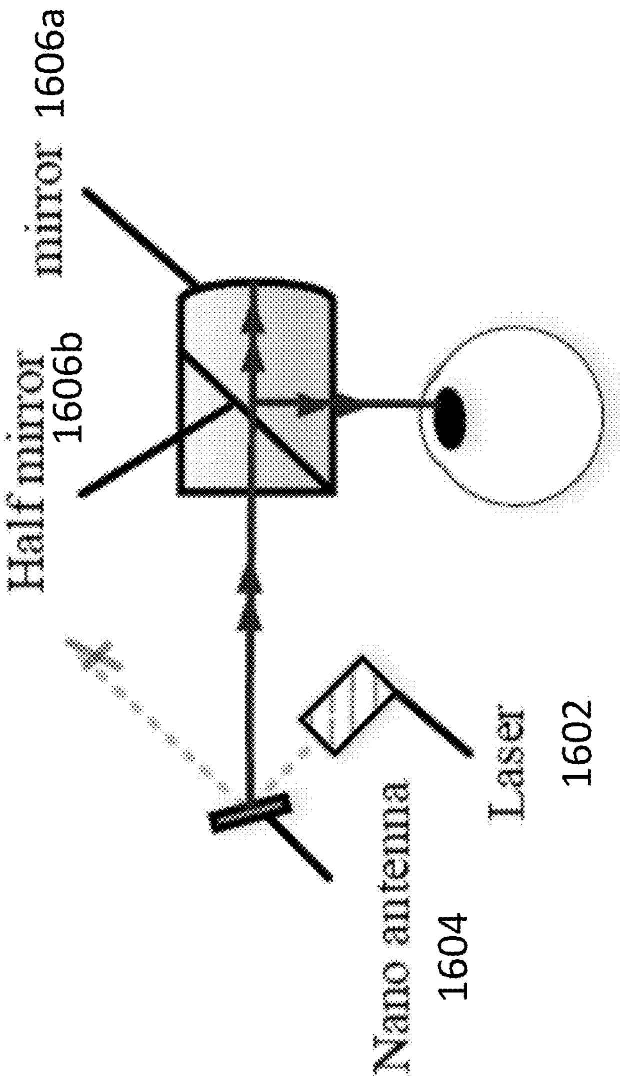
FIG. 16 shows a schematic of a near-eye display system based on off-axis illumination using a reflective spatial light modulator (SLM) without an attenuator according to various embodiments.

FIG. 16 shows a schematic of a near-eye display system based on off-axis illumination using a reflective spatial light modulator (SLM) 1604 without an attenuator according to various embodiments.

The SLM 1604 may be a nano-antenna spatial light modulator (NSLM). The near-eye display system may include a light source 1602, such as a laser source or light emitting diode, configured to generate a light beam. The system may also include a spatial light modulator 1604 (e.g. a nano-antenna spatial light modulator (NSLM) including one or more nano-antennas) configured to modulate the phase of the light beam generated by the light source 1602. The spatial light modulator 1604 may be a reflective spatial light modulator, and may be configured to reflect the incoming light beam from the light source 1602 to generate the modulated light beam. The system may further include an eyepiece for directing the modulated light beam to an eye of a viewer. The eyepiece may include a curved mirror 1606*a* and a half mirror 1606*b*. The modulated light beam from the spatial light modulator 1604 may impinge and be reflected by the curved mirror 1606*a*, before impinging and being reflected by the half mirror 1606*b* to the eye of the viewer.

During the usage of the system, the pupil of the eye (i.e. eye pupil) may be placed at the image plane of the spatial light modulator. In order to enlarge the exit pupil, the near eye display system may incorporate features related to eye tracking. As the pupil position is the conjugated image of the NSLM, the position of the nanoantenna can be controlled to track the eye pupil.

Figure 17:
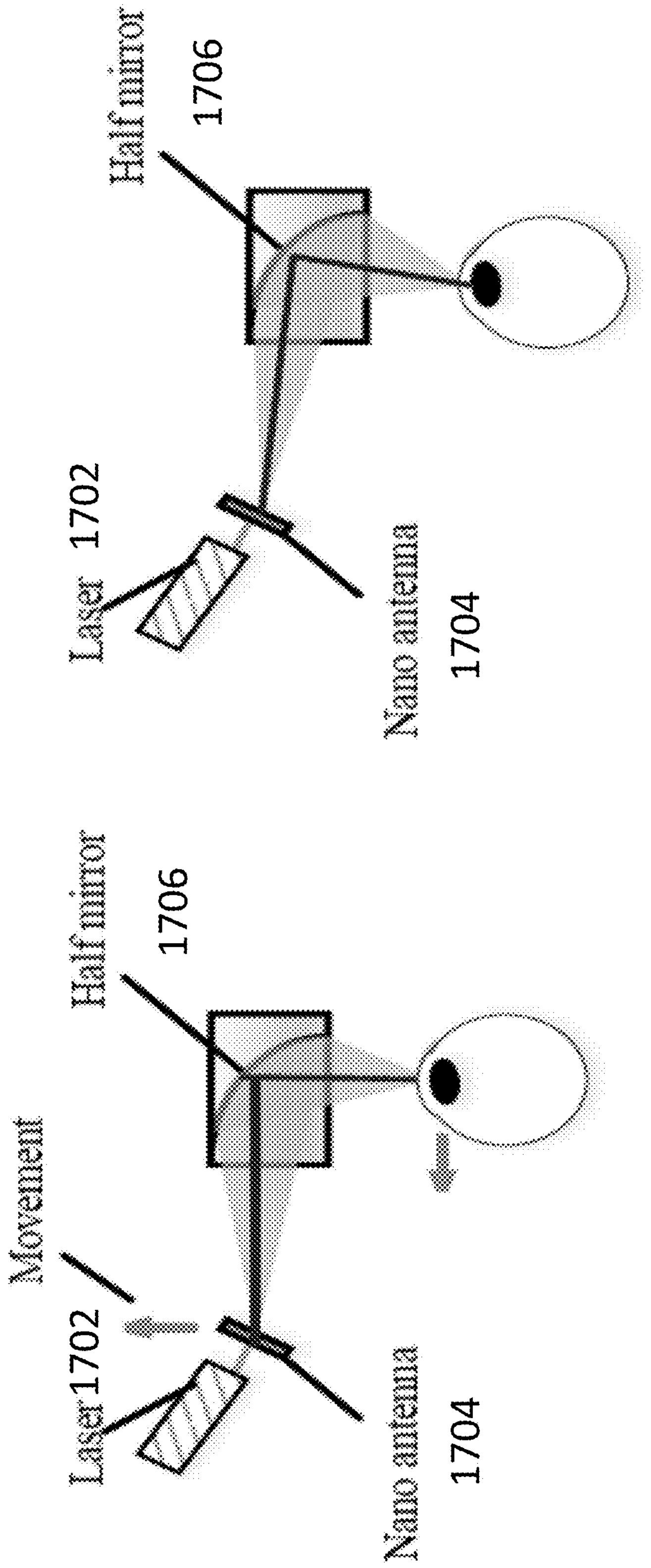
FIG. 17 shows a schematic of a near-eye display system including eye tracking features using a transmissive spatial light modulator (SLM) according to various embodiments.

FIG. 17 shows a schematic of a near-eye display system including eye tracking features using a transmissive spatial light modulator (SLM) 1704 according to various embodiments. The spatial light modulator (SLM) 1704 may be a nano-antenna spatial light modulator. The spatial light modulator may also include a light source 1702, and the eyepiece 1706 (which may include a half mirror). The eye tracking features may include an eye tracking sub-system, and a movement controlling sub-system (also referred to as a scanning sub-system).

The eye tracking sub-system may be configured to track the position of the eye of the viewer, e.g. the eye pupil of the viewer. As shown in FIG. 17, when the eye moves outside of the image of the spatial light modulator 1704 (for example the direction indicated by the arrow), the movement controlling sub-system may move the display source including the light source 1702 and spatial light modulator 1704, to track the eye position. According to the optical imaging principle, the distance moved can be calculated by the focal length of the eyepiece 1706 and the distance that the eye pupil is away from the viewing imaging position.

Figure 18:
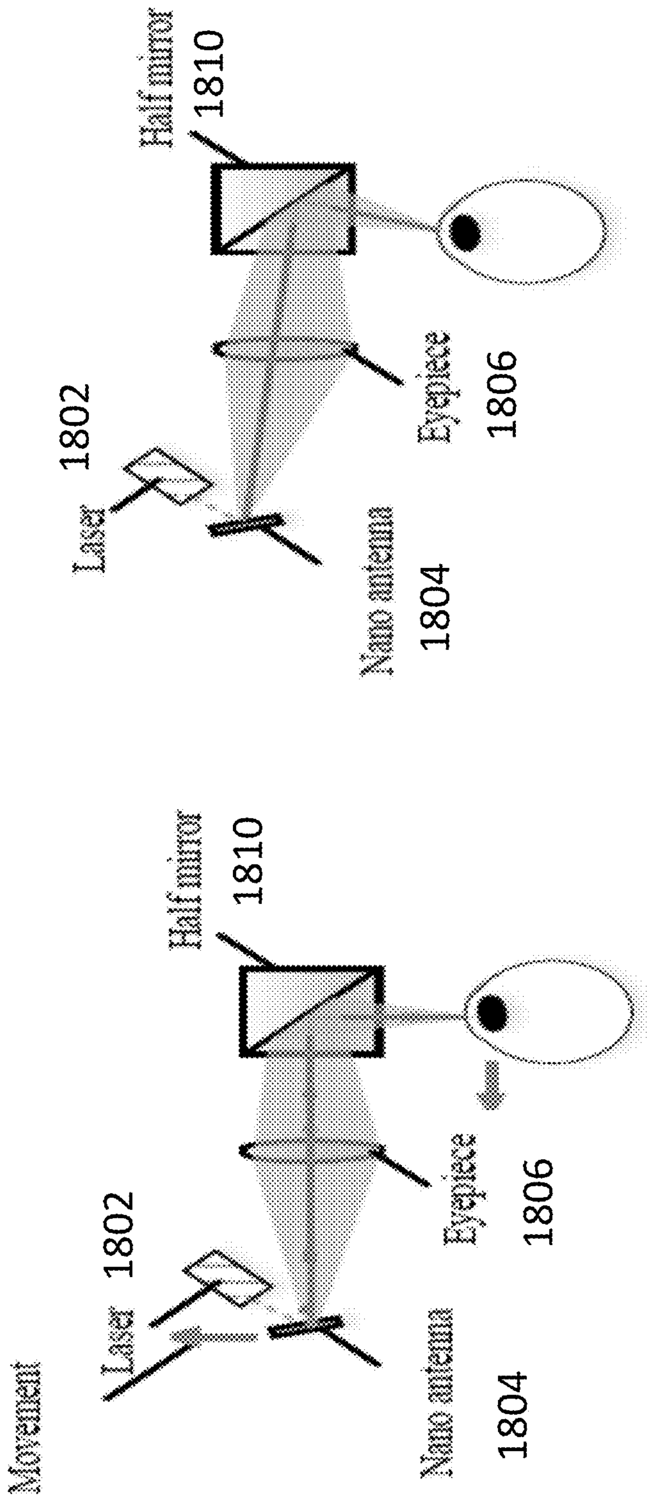
FIG. 18 shows a schematic of a near-eye display system including eye tracking features using a reflective spatial light modulator (SLM) according to various embodiments.

FIG. 18 shows a schematic of a near-eye display system including eye tracking features using a reflective spatial light modulator (SLM) 1804 according to various embodiments.

The SLM 1804 may be a nano-antenna spatial light modulator (NSLM). The near-eye display system may include a light source 1802, such as a laser source or light emitting diode, configured to generate a light beam. The system may also include a spatial light modulator 1804 (e.g. a nano-antenna spatial light modulator (NSLM) including one or more nano-antennas) configured to modulate the phase of the light beam generated by the light source 1802. The spatial light modulator 1804 may be a reflective spatial light modulator, and may be configured to reflect the incoming light beam from the light source 1802 to generate the modulated light beam. The system may further include an eyepiece 1806 for directing the modulated light beam to an eye of a viewer. The system may additionally include a half mirror 1810 configured to direct the modulated light beam from the eyepiece 1806 to the eye of the viewer.

Most current commercial near-eye displays provide only one depth plane in space, so the users suffer from the blurred image if they want to observe the object with a large range of depths. Previous works to solve the problem resulted in bulky systems or low-resolution performance. Various embodiments may relate to a method to provide accommodation-free virtual image using a small-pixel size and small aperture SLM (e.g. NSLM) as the display device. As the virtual image generated by the optical system does not blur at a large range of depths, the users can use these near-eye displays for prolonged periods of time without eye fatigue. This advantage may have great commercial potential, especially in AR and VR display fields, as none of currently available products provides such a feature.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

The invention claimed is:

1. An optical system comprising:

a light source configured to generate a light beam, the light beam being coherent or partially coherent; and a spatial light modulator configured to modulate a phase of the light beam; and an eyepiece for directing the modulated light beam to an eye of a viewer, the eyepiece being a lens and arranged to be spaced from the spatial light modulator without any additional lenses between the eyepiece and the spatial light modulator, such that an optical distance between the spatial light modulator and a main plane of the eyepiece, the main plane of the eyepiece being a plane passing through a center of the eyepiece and perpendicular to a principal axis of the eyepiece, is greater than a focal length of the eyepiece;

wherein the spatial light modulator is a nano-antenna spatial light modulator including one or more nano-antennas and comprising an active display area having a dimension, the dimension being a length, a diameter or a width of the active display area, of less than 2 millimeters.

2. The optical system according to claim 1, wherein the light beam is incident along a normal axis of the spatial light modulator perpendicular to an optical display area of the spatial light modulator; and wherein the normal axis of the spatial light modulator is not parallel to the principal axis of the eyepiece.

3. The optical system according to claim 1, wherein the spatial light modulator has a pixel size of less than 2 microns.

4. The optical system according to claim 1, wherein the spatial light modulator is configured to generate a reconstructed holographic image based on a hologram loaded onto the spatial light modulator.

5. The optical system according to claim 4, wherein a distance between the reconstructed holographic image and the eyepiece is less than the focal length of the eyepiece.

6. The optical system according to claim 1, further comprising:

a spatial filter configured to remove zero-order diffraction of the modulated light beam.

7. The optical system according to claim 1, further comprising:

an eye tracking sub-system for tracking a movement of the eye of the viewer; and a scanning sub-system in electrical connection with the eye tracking sub-system;

wherein the scanning sub-system is configured to adjust the optical system based on the movement of the eye of the viewer.

8. The optical system according to claim 1, further comprising:

an attenuator configured to reduce an energy of the modulated light beam.

9. The optical system according to claim 1, wherein the eyepiece comprises one or more optical see-through elements.

10. The optical system according to claim 1, wherein the spatial light modulator comprises an array of nanoantennas.

11. The optical system according to claim 1, wherein the spatial light modulator is a transmissive spatial light modulator.

12. The optical system according to claim 1, wherein the spatial light modulator is a reflective spatial light modulator.

13. The optical system according to claim 1, wherein the light source is a laser source or a light emitting diode.

14. A method of forming an optical system, the method comprising:

providing a light source configured to generate a light beam, the light beam being coherent or partially coherent;

providing a spatial light modulator configured to modulate a phase of the light beam; and arranging an eyepiece for directing the modulated light beam to an eye of a viewer, the eyepiece being a lens and arranged to be spaced from the spatial light modulator without any additional lenses between the eyepiece and the spatial light modulator, such that an optical distance between the spatial light modulator and a main plane of the eyepiece, the main plane of the eyepiece being a plane passing through a center of the eyepiece and perpendicular to a principal axis of the eyepiece, is greater than a focal length of the eyepiece;

wherein the spatial light modulator is a nano-antenna spatial light modulator including one or more nano-antennas and comprises an active display area having a dimension, the dimension being a length, a diameter or a width of the active display area, of less than 2 millimeters.

15. The method according to claim 14, wherein the beam is incident along a normal axis of the spatial light modulator perpendicular to an optical display area of the spatial light modulator; and wherein the normal axis of the spatial light modulator is not parallel to the principal axis of the eyepiece.

16. The method according to claim 14, wherein the spatial light modulator is configured to generate a reconstructed holographic image based on a hologram loaded onto the spatial light modulator.

17. The method according to claim 16, wherein a distance between the reconstructed holographic image and the eyepiece is less than the focal length of the eyepiece.

* * * * *